US010139542B2

(12) United States Patent
Rudek et al.

(10) Patent No.: US 10,139,542 B2
(45) Date of Patent: *Nov. 27, 2018

(54) LIGHTING DEVICE COMPRISING A LIGHT GUIDE AND A SUPPORT (71) Applicant: 3M INNOVATIVE PROPERTIES COMPANY, St. Paul, MN (US)

(72) Inventors: David M. Rudek, Dusseldorf (DE); Joerg R. Purfuerst, Schwabisch Hall (DE); Hans-Michael Vogt, Bochum (DE)

(73) Assignee: 3M Innovative Properties Company, St. Paul, MN (US)

( * ) Notice: Subject to any disclaimer, the term of this patent is extended or adjusted under 35 U.S.C. 154(b) by 514 days.

This patent is subject to a terminal disclaimer.

(21) Appl. No.: 14/496,248

(22) Filed: Sep. 25, 2014

(65) Prior Publication Data

US 2015/0009707 A1 Jan. 8, 2015

Related U.S. Application Data (63) Continuation of application No. 14/177,637, filed on Feb. 11, 2014, which is a continuation of application (Continued)

(30) Foreign Application Priority Data

Jul. 18, 2008 (GB) .................................. 0813186.4

(51) Int. Cl.
*G02B 6/00* (2006.01)
*F21V 8/00* (2006.01)
(Continued)

(52) U.S. Cl.
CPC ........... *G02B 6/0005* (2013.01); *B60Q 3/217* (2017.02); *B60Q 3/64* (2017.02); *B60Q 3/78* (2017.02);
(Continued)

(58) Field of Classification Search
CPC ... F21V 2008/003; G02B 6/00; G02B 6/0005; G02B 6/001; G02B 6/0088; G02B 6/0038; B60Q 3/64; B60Q 3/78; B60Q 3/217
(Continued)

(56) References Cited

U.S. PATENT DOCUMENTS 5,432,876 A 7/1995 Appeldorn
5,631,994 A 5/1997 Appeldorn
(Continued)

FOREIGN PATENT DOCUMENTS

DE 10031527 1/2002
DE 10259623 7/2004
(Continued)

OTHER PUBLICATIONS

PCT International Search Report for PCT/US2009/050447, dated Jan. 20, 2010.

*Primary Examiner* — Anh Mai
*Assistant Examiner* — Meghan Ulanday
(74) *Attorney, Agent, or Firm* — Robert S. Moshrefzadeh (57) ABSTRACT A lighting device (30) comprises a side-light light guide 1' located in a support (2) that has an elongate opening for the passage of light emitted by the light guide. The support (20) is shaped to provide contact edges (24) and the only physical engagement between the support and the light guide is along those contact edges. The support also has planar surfaces internal positioned adjacent, and parallel to, planar surfaces (15) in the light guide to retain the light guide in the required orientation in the support. To enhance the flexibility of the support, in some embodiments only part of the support is continuous along the whole length of the support. (FIGS. 14 to 19).

3 Claims, 8 Drawing Sheets

Related U.S. Application Data

No. 13/893,881, filed on May 14, 2013, now Pat. No. 8,684,578, which is a continuation of application No. 13/054,655, filed as application No. PCT/US2009/050447 on Jul. 14, 2009, now Pat. No. 8,459,854.

(51) Int. Cl.
    *B60Q 3/64*     (2017.01)
    *B60Q 3/217*     (2017.01)
    *B60Q 3/78*     (2017.01)

(52) U.S. Cl.
    CPC .......... *G02B 6/001* (2013.01); *G02B 6/0088* (2013.01); *G02B 6/0038* (2013.01)

(58) Field of Classification Search
    USPC .......... 362/23.09, 23.16, 511, 551, 581, 600, 362/615, 616, 628; 385/136, 137
    See application file for complete search history.

(56) References Cited

U.S. PATENT DOCUMENTS

| | | |
|---|---|---|
| 5,680,496 A | 10/1997 | Burkitt, III |
| 5,832,164 A | 11/1998 | Miekis |
| 5,845,038 A | 12/1998 | Lundin |
| 6,077,462 A | 6/2000 | Lundin |
| 6,123,442 A | 9/2000 | Freier |
| 6,301,418 B1 | 10/2001 | Freier |
| 6,367,941 B2 | 4/2002 | Lea |
| 6,412,969 B1 | 7/2002 | Torihara et al. |
| 6,763,172 B2 | 7/2004 | Sahlin |
| 6,848,822 B2 | 2/2005 | Ballen |
| 7,287,896 B2 | 10/2007 | Okamoto et al. |
| 8,267,540 B2 * | 9/2012 | Klu .................. F21S 8/022 362/153 |
| 8,684,578 B2 | 4/2014 | Rudek et al. |
| 2001/0035927 A1 | 11/2001 | Sasagawa et al. |
| 2004/0240829 A1 | 12/2004 | Sahlin |
| 2009/0003014 A1 | 1/2009 | Jablonski |
| 2014/0029292 A1 | 1/2014 | Mizushiro et al. |

FOREIGN PATENT DOCUMENTS

| | | |
|---|---|---|
| JP | H11-191303 | 7/1999 |
| JP | 2005-025972 | 1/2005 |
| WO | WO 00/25159 | 5/2000 |
| WO | WO 01/51851 | 7/2001 |
| WO | WO 2006/126155 | 11/2006 |
| WO | WO 2008/022007 | 2/2008 |

* cited by examiner

LIGHTING DEVICE COMPRISING A LIGHT GUIDE AND A SUPPORT

FIELD OF THE INVENTION

The present invention relates to lighting devices of the type comprising a light guide located in a support. The invention is concerned, in particular, with lighting devices of that type in which the light guides emit light along their length.

BACKGROUND

Light guides are increasingly being used for decorative and functional lighting purposes in various locations, some of which require the light guide to emit light selectively (e.g., comparatively uniformly or in a particular direction) along its length. Such light guides are referred to hereinafter as side-light guides. Various mechanisms are known for enabling light that is injected into a guide from a light source at one end to be extracted selectively from the guide along its length to provide, effectively, a linear lighting device. It is recognized that the use of side-light guides in linear lighting devices offers certain advantages: these include, for example, the possibility of using a low voltage light source such as an LED light source, and of separating the light source from the area in which the lighting device is actually located.

One form of side-light guide is described in EP-A-0 594 089 (in the name of Minnesota Mining and Manufacturing Company). The guide has light-extraction elements spaced along its length to cause light that is being propagated along the guide from at least one end thereof to be emitted selectively through a light-emitting region in the wall of the guide. In that case, the light-extraction elements comprise notches in the light guide, each notch having at least one reflecting surface of optical quality i.e., a surface that diffusely scatters only a small amount (generally less than 20%) of the light incident upon it. EP-A-0 956 472 (in the name of Minnesota Mining and Manufacturing Company) and EP-A-1 153 240 (in the name of 3M Innovative Properties Company) both describe other light guides of that type: in the guide described in EP-A-0 956 472, two sets of notches centered along different longitudinal axes are provided with a view to controlling the lateral distribution of light emitted by the guide while, in the guide described in EP-A-1 153 240, the notches have different notch angles with a view to producing a predetermined pattern in the illumination provided by the guide. Generally, light guides of that type offer the advantage that they can be designed to emit light very efficiently along their length and in a preferred direction with a pre-selected distribution, making them suitable for use in lighting devices in a wide number of applications.

Other forms of side-light guides are described, for example, in WO 99/22173, WO 00/25159 and WO 01/51851. WO 99/22173 (in the name of 3M Innovative Properties Company) describes a light guide comprising a core surrounded by cladding, in which the inner surface of the cladding is formed with indentations that cause light to be extracted from the light guide. A light-reflecting member may be provided around a portion of the light guide to redirect some of the extracted light in a particular direction. WO 00/25159 (in the name of Minnesota Mining and Manufacturing Company) describes a light guide comprising a core surrounded by a two-part cladding layer, in which the cladding incorporates various reflective materials to enhance the extraction and uniformity of the light emitted by the guide along its length. WO 01/51851 (in the name of 3M Innovative Properties Company) describes a light guide having light extraction structures spaced along its length to cause light to be directed from the light guide towards a diffuse reflective layer that, in turn, directs the light back through the light guide so that it is finally emitted through the region of the guide in which the light extraction structures are located.

Side-light guides are available in both flexible and rigid forms, and in materials that will not break or shatter and have a comparatively long useful life. They are also capable of providing a high level of illumination in an energy-efficient manner. Lighting devices incorporating side-light guides have already been used in various locations. They can, for example, be used as cost effective, safe, versatile alternatives to fluorescent tubes in commercial, architectural, and consumer lighting applications but can also be used in situations in which fluorescent tubes are impractical and/or to achieve effects that cannot be obtained using conventional lighting devices. For example, there is increasing interest in the use of side-light guides in lighting devices in vehicles and it has already been proposed to use such devices on the outside of a vehicle, to outline features such as the rear window or the boot. More recently, manufacturers have become interested in using side-light guides in lighting devices in car interiors for both practical and aesthetic reasons (see, for example, DE-A-100 31 527 in the name of Volkswagen AG and DE-A-102 59 623 in the name of Hella KG Hueck & Co).

When a side-light guide is used in a lighting device, it is usually necessary to support the guide in some way, to retain it in the required position and ensure that light is emitted in the required direction. Known methods of supporting side-light guides include the use of brackets or clips (for example, as described in U.S. Pat. No. 6,763,172 of 3M Innovative Properties Company), and channels or rails (for example, as described in US 2004/0240829 also of 3M Innovative Properties Company, in WO 99/22174 of Minnesota Mining and Manufacturing Company, and in the above-mentioned WO 00/25159). In the particular case in which a light guide is used as a lighting device for a car interior, the above-mentioned DE-A-100 31 527 and DE-A-102 59 623 describe that it may be located in a gap in the interior lining of the vehicle.

WO 2008/022007 (3M Innovative Properties Company) describes various forms of side-light light guides and supports for facilitating the assembly of lighting devices. More especially, for light guides having defined light-emitting regions, WO 2008/022007 is concerned with facilitating the installation of a light guide securely and in a particular orientation in a support to form a lighting device, advantageously without substantial detriment to the light output of the guide through the light emitting region.

SUMMARY OF THE INVENTION

The present invention is directed to lighting devices comprising a side-light light guide located in a support that has an elongate opening for the passage of light emitted by the light guide. More particularly, the invention is concerned with the provision of a lighting device, the construction of which enables the device to be easily assembled while further reducing the effect of the support on the amount of light emitted through the elongate opening. The invention is also concerned with the provision of a lighting device, the construction of which enables the device to be easily assembled while providing enhanced retention of the light guide in the required orientation within the support. The invention is further concerned with the provision of a lighting device in which the construction of the support enables the flexibility of the support to be increased. The present invention provides a lighting device comprising a side-light light guide located in a support that has an elongate opening for the passage of light emitted by the light guide; wherein the support and/or the light guide is formed with at least one contact edge, and wherein the only physical engagement between the support and the light guide is provided by the contact edge(s). The/each contact edge may be formed between two respective relatively-inclined surfaces; alternatively, it may be located on a curved surface.

The use of the contact edge(s) in the support for engaging the light guide reduces the engagement between the support and the light guide to one or more line contacts only.

That, in turn, enables the effect of the support on the light output of the light guide to be minimized.

The present invention further provides a lighting device comprising a side-light light guide located in a surrounding support, in which the light guide has a light-emitting region extending lengthwise of the guide, and is oriented so that the light-emitting region is aligned with an elongate opening in the support; the support comprising at least one planar surface positioned adjacent, and parallel to, a planar surface in the light guide to retain the light guide in the said orientation.

In a lighting device in accordance with this aspect of the invention, the adjacent planar surfaces in the light guide and the support enable relative movement between the light guide and the support to be minimized, enabling the light guide to be retained in the required orientation.

The present invention also provides a lighting device comprising a side-light light guide having a lengthwise-extending light-emitting region, and a lengthwise extending support in which the light guide is located, the support being shaped to engage the light guide to retain it within the support while providing an elongate opening for the passage of light emitted by the light guide; wherein a part only of the support extends continuously along the whole length of the support.

In a lighting device in accordance with this aspect of the invention, the omission of parts of the support enables the flexibility of the support, particularly in a lengthwise direction, to be increased and can facilitate the installment of the support along a curved path.

The light guide may have a light-emitting region extending lengthwise of the guide, the light guide being oriented in the support so that the light-emitting region is aligned with the elongate opening in the support. The light guide may comprise light extraction elements arranged to direct light out of the light guide through the light emitting region. In an embodiment of the invention, the light-extraction elements are formed in the periphery of the light guide on one side of thereof, and the light emitting region is on the other side of the guide. The light-extraction elements, which may be in the form of notches, may comprise optically-smooth reflecting surfaces.

Advantageously, the light guide is formed from a flexible material. The light guide may have, along at least part of its length, at least one location feature that is contacted by the support to retain the light guide in the support. The said at least one location feature may be positioned on the periphery of the light guide between the light-extraction elements and the light-emitting region of the guide. In an embodiment of the invention, the light guide is provided with two location features in opposed positions on the periphery of the guide between the light-extraction elements and the light-emitting region of the guide. The/each location feature may be formed by a respective cut-away region removed from a light guide which, excluding the location feature(s), has a regular cross-section, for example a circular, elliptical or rectangular cross-section.

A lighting device in accordance with the invention may be assembled by pushing the light guide into the support through the elongate opening in the latter.

Advantageously, the support and/or the light guide are shaped so that, during this process, the user receives an audible and/or tactile indication that the light guide has been correctly positioned in the support.

The support may extend substantially along the whole length of the light guide. In some cases, however, the support may be interrupted, for example if the light guide follows a tightly-curving path.

BRIEF DESCRIPTION OF THE DRAWINGS

In use, a lighting device in accordance with the invention is provided with at least one light source positioned to inject light into the light guide at one end thereof. By way of example, light guides and lighting devices in accordance with the invention will be described with reference to the accompanying drawings, in which.

DETAILED DESCRIPTION

Figure 1:
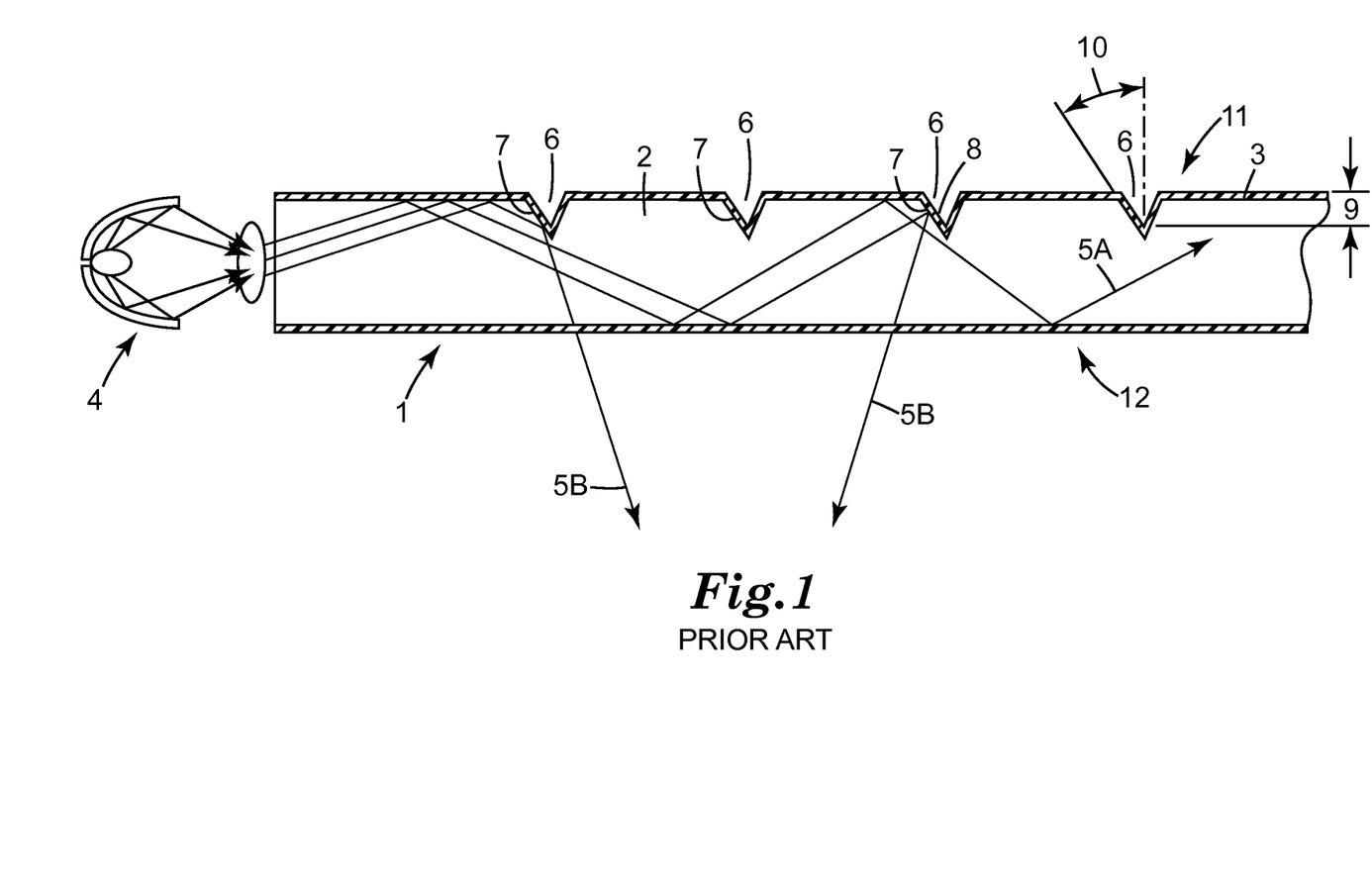
FIG. 1 is a diagrammatic longitudinal cross-section of a known side-light guide.

FIG. 1 shows, diagrammatically, an elongate flexible light guide 1 of the type described in EP-A-0 594 089. The guide 1, which is generally cylindrical with a circular cross-section, comprises a solid core 2 formed from a suitable light transmitting material and surrounded by a cladding material 3 having a lower refractive index than the core material. Light injected by a light source 4 into the guide 1 at one end will propagate along the guide in known manner, within the core 2, by total internal reflection at the interface between the core 2 and the cladding 3 as indicated by the ray 5A.

Typically, the cladding material 3 is air (i.e., the guide consists solely of the naked core 2) and, for the purposes of clarity, light guides are shown in subsequent Figures without any cladding material although such material could be included if required.

The light guide 1 is provided, along its length and on one side 11, with spaced light-extraction elements 6 in the form of notches that extend into the guide core 2 (through the cladding layer 3 when present). As described in EP-A-0 594 089, the notches 6 comprise optically-smooth reflecting surfaces 7 that are designed to cause light which is incident on one of these surfaces while propagating along the guide core 2 to be diverted selectively out of the guide through a light-emitting region 12 on the diametrically-opposite side of the guide 1, as indicated by the rays 5B. A reflector (not shown) may be provided at the end of the light guide 1 remote from the light source 4 to return to the light guide any light that has not been diverted out of the guide by the notches 6. Alternatively, a second light source may be provided to inject light into the guide from that end.

A more detailed explanation of the effect of the notches 6 can be obtained, if required, from EP-A-0 594 089 together with a description of the various forms that these notches can take. Additional information concerning other forms of the notches, and their location on a light guide, can be obtained from EP-A-0 956 472; 1 153 240 and 1 509 791. In some cases, as described for example in U.S. Pat. No. 5,631,994, the notches 6 may be provided in an overlay located on the outside of the light guide 1. Generally, the characteristics of the light output along the length of the guide 1 are determined by factors such as: the depth 9 to which the notches 6 extend into the guide 1; the angles of inclination 10 of the notch surfaces 7; and the distance between the notches along the length of the guide. To minimize light loss through the surfaces 7 of the notches 6, those surfaces may be provided with a coating 8 of reflective material such as aluminum or silver.

Light guides having light extraction elements in the form of notches 6 as described above can provide an efficient means of converting the light from a source 4 into an elongate form that can readily be adapted to meet particular lighting requirements. As already mentioned above, however, other forms of side-light guides incorporating other types of light extraction elements are also known.

When a light guide of the general type described above is used in a lighting device, it is usually necessary to provide a support by which the guide is held in the lighting device to emit light in the required direction. It should be possible to install the light guide quickly and easily in the correct orientation in the support, preferably without the use of special tools. Once installed, the light guide should be securely retained in position and the support will, typically, be required to have minimal detrimental impact on the light output of the guide.

A suitable support for the light guide will be described below. To facilitate the installation and retention of the light guide in the support, the generally-cylindrical guide of FIG. 1 is cut away on opposed sides, as indicated at 13 in FIG. 2, to form location features in the periphery of the guide between the region 11 containing the notches and the light-emitting region 12. The two cut-away regions 13 are identical and each forms two planar surfaces 14, 15 on the exterior of the modified light guide 1'. The surfaces 14 extend inwardly from the light-emitting region 12 of the light guide and, as described below, function as contact surfaces. The surfaces 15 extend, parallel to each other, from the inner edges of the contact surfaces 14 to the notch containing region 11 of the light guide and, as described below, function as guiding surfaces.

Figures 2, 3, 4, 5:
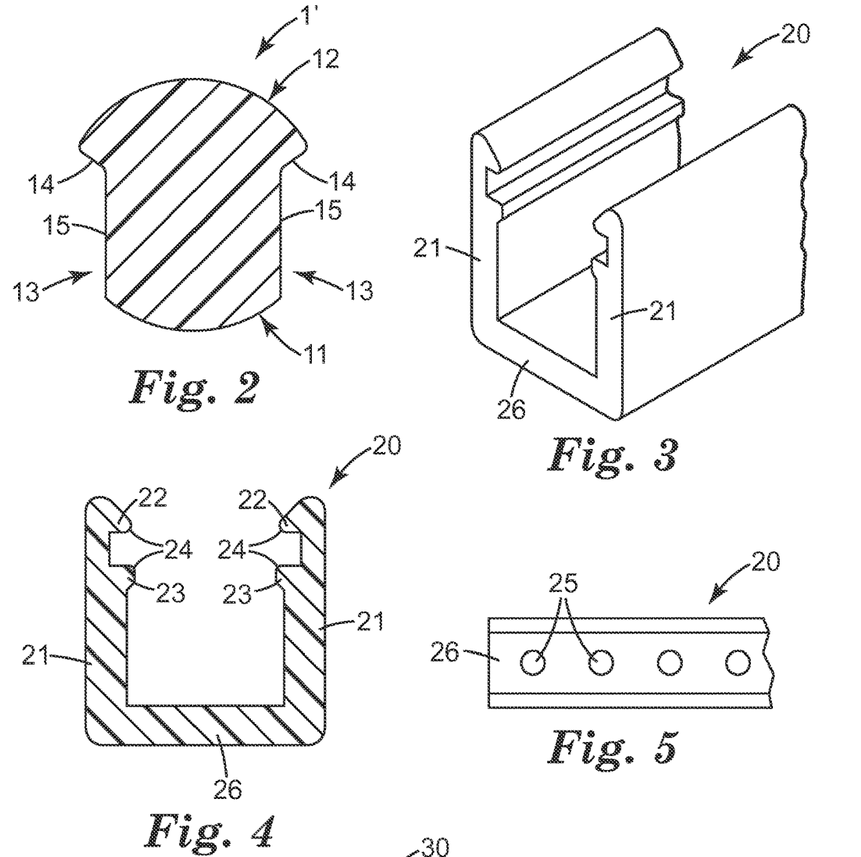
FIG. 2 is a transverse cross-section of a light guide of the type shown in FIG. 1, modified for use in a lighting device in accordance with the present invention.
FIG. 3 is a perspective view of one end of a support suitable for use, with the light guide of FIG. 2, in a lighting device in accordance with the invention.
FIG. 4 is a transverse cross-section of the support of FIG. 3.
FIG. 5 is a plan view of the support of FIG. 3.

The original form of the light guide 1' is retained in the notch-containing region 11 and in the light-emitting region 12 and it has been found that the light guide will continue to function effectively as described above with reference to FIG. 1, despite the presence of the cut-away regions 13. Any reduction in the light output of the guide 1' due to the presence of the cut-away regions 13 can be determined by, for example, measuring the flux onto a surface located at a set distance from the guide and it has been found possible to ensure that the total light output through the light-emitting region 12 of the light guide (indicated as being contained by the angle α) is reduced, if at all, by no more than 10%, preferably no more than 5%.

FIGS. 3 to 5 show a support 20 for the light guide 1'. The support 20 has the form of an elongate channel of generally U-shaped cross-section (shown most clearly in FIG. 4), the internal dimensions of which relate to the external dimensions of the light guide 1' as will be described below. The open side of the channel provides a passage for light emitted by the light guide, when located in the support as described below. Outer and inner contact features 22, 23 are formed, one above the other, on the inner surface of the upper end of each arm 21 of the U-shaped channel. The contact features 22, 23 extend along the length of the support 20 and each contact feature comprises two relatively-inclined surfaces that meet along a lengthwise-extending contact edge 24 within the support. A series of apertures 25 (FIG. 5) is provided in the base 26 of the support, by which the support can be mounted on a substrate (not shown) using, for example, screws or rivets or suitable snap connectors. However, alternative methods of mounting the support on a substrate can be used if required. For example, the support can be bonded to a substrate by an adhesive or by a double-sided adhesive tape.

Figure 6:
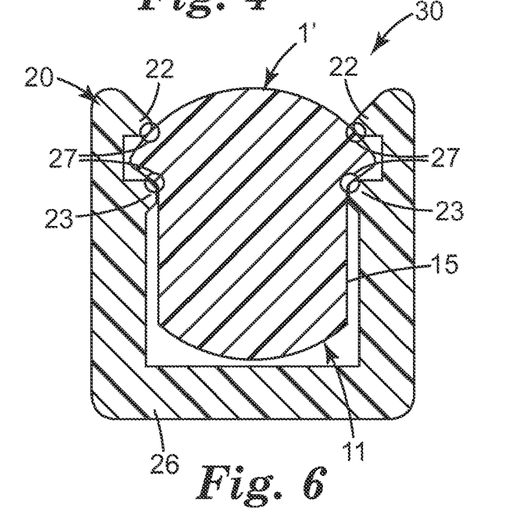
FIG. 6 is a transverse cross-section of a lighting device comprising the light guide of FIG. 2 positioned in the support of FIG. 3.

FIG. 6 illustrates a lighting device 30 in accordance with the invention, comprising the light guide 1' of FIG. 2 installed in the support 20 of FIGS. 3 to 5. The lighting device is assembled by pushing the light guide 1', notch-containing region 11 first, into the support 20 between the arms 21. During the initial part of this movement, the guiding surfaces 15 of the light guide 1' position the light guide between the contact features 22, 23 on the arms 21. When the contact surfaces 14 of the light guide 1' encounter the outer contact features 22, the light guide will flex slightly until the outer edges of the light-emitting region 12 of the light guide snap over the outer contact features 22 and into the space between the two sets of contact features 22, 23 on each side of the support. The arms 21 of the support will then retain the light guide 1' in the manner illustrated in FIG. 6 (i.e., the contact edges 24 of the inner and outer contact features 22, 23 of the support engage, respectively, the contact surfaces 14 of the light guide and the surface adjacent the light-emitting region 12, as indicated by the circles 27). The result is that the notch-containing region 11 of the light guide is located adjacent, but spaced apart from, the inside face of the base 26 of the support 20, and the light-emitting region 12 of the light guide projects from the support. As illustrated, the light guide 1' is a comparatively close fit within the support 20 so that the planar guiding surfaces 15 of the light guide are positioned adjacent, and parallel to, the planar internal surfaces of the respective arms 21 of the support: in that way relative movement between the light guide and the support is minimized and the light guide is retained in the required orientation.

Figure 20:
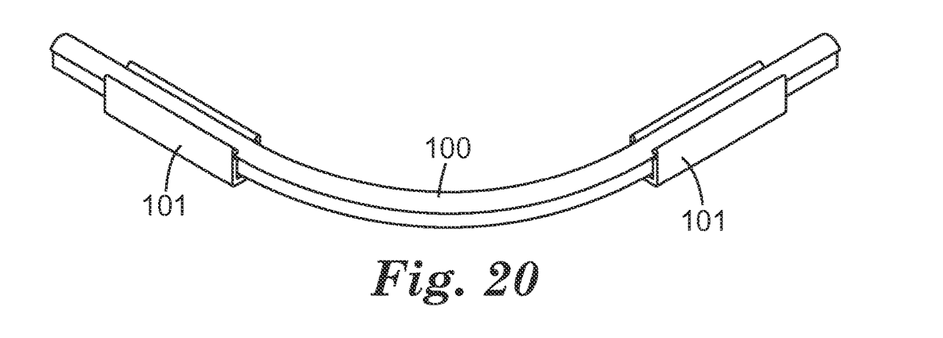
FIG. 20 is a perspective view of a light guide provided with spaced-apart supports.

The support 20 will typically be formed from a plastic material, for example one that is suitable for injection moulding or extrusion, and may be selected for interior or exterior use as required. Advantageously, the characteristics of the material allow the light guide 1' to be pushed into the support rail 20 as described above without the use of any special tools. The base 26 of the support, being in close proximity to the notch containing region 11 of the light guide, acts as a stop to prevent the light guide being pushed too far into the support, which could lead to distortion of the light-emitting region 12.

The use of the contact edges 24 in the support 20 for engaging the light guide 1' means that the engagement between the support and the light guide is reduced to line contacts only. That, in turn, enables the effect of the support on the light output of the light guide to be minimized.

The light guide 1' can be formed from any suitable light-transmitting material including, for example, glass and polymeric materials such as acrylate, silicone, and urethane materials. The guide may be comparatively rigid but is advantageously a flexible product as described above that can be bent to follow a desired contour. In the latter case particularly, the engagement between the support 20 and the light guide 1' ensures that the light guide does not become twisted as it is being installed in the support but always remains in the desired radial orientation with the light-extraction notches 6 at the rear of the support and the light-emitting region 12 of the guide projecting through the front opening of the support. The snap fit of the light guide in the support, which occurs when the contact surfaces 14 of the light guide pass over the outer contact features 22 of the support, advantageously serves to provide audible and/or tactile feedback to the user that the light guide is properly positioned in the support. The degree of feedback provided will depend on the nature of the materials used for the light guide and the support, and the particular shaping of the contact surfaces 14 of the light guide and the outer contact features 22 of the support 20. In the case in which the light guide is a comparatively rigid product, it may be necessary to provide the arms 21 of the support 20 with a degree of flexibility to facilitate the insertion of the light guide into the support.

It will be appreciated that, although the light guide 1' shown in FIG. 2 is based on a guide having a circular cross-section, other basic cross-sections (for example, elliptical and rectangular cross-sections) are possible. The shape of the cutaway regions 13 can also be varied. For example, it is not essential for the guiding surfaces 15 of the light guide to be parallel to one another: as an alternative, they could be arranged in a wedge-shape with the internal cross-section of the support 20 being similarly modified so that at least one of the guiding surfaces 15 of the light guide is positioned adjacent, and parallel to, the planar internal surface of the respective arm 21 of the support.

More generally, it will be appreciated that the positions of the location features and the contact edges could be interchanged in the lighting device of FIG. 6, by appropriate shaping of the light guide 1'and the support 20 (i.e., the location features could be formed in the support instead of the light guide, and the contact edges could be formed in the light guide instead of the support).

The light guide 1', including the light-extraction notches 6, may be a moulded component. One method of manufacturing a light guide with light extraction notches by a moulding process is described in U.S. Pat. No. 6,077,462.

Figure 7:
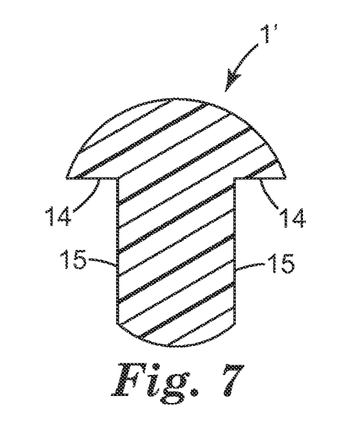
FIG. 7 is similar to FIG. 2 but shows a modified form of the light guide.

A modified version of the light guide 1' is shown in FIG. 7. The modification relates to the orientation of the contact surfaces 14 which now lie at right angles to the respective guide surfaces 15 on the light guide. The modified shaping facilitates manufacture of the light guide, and serves to retain the light guide more securely in the support 20 (although the internal shape of the latter would require modification, especially in the region of the inner contact features 23, to retain the edge contact between the support and the light guide). The modified shaping of the light guide will also alter the audible and/or tactile feedback provided to the user when the contact surfaces 14 of the light guide pass over the outer contact features 22 of the support.

Figure 8:
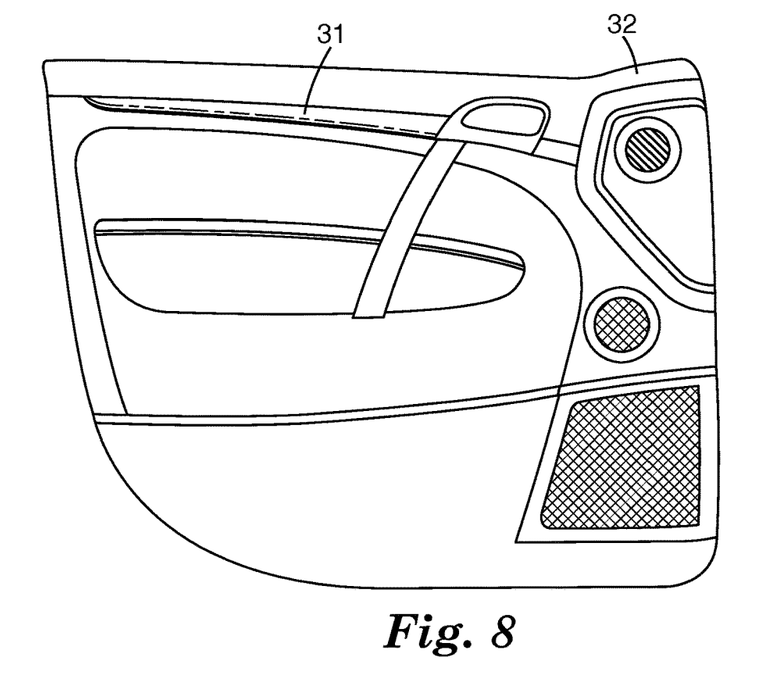
FIG. 8 illustrates the lighting device of FIG. 6 installed in the interior of a vehicle door.

A lighting device of the type shown in FIG. 6 can be employed in many different lighting applications, both aesthetic and practical. As already mentioned, there is increasing interest in using lighting devices that incorporate side-light guides in road vehicles, for interior and exterior lighting. However, they can also be used in other vehicles, including all forms of public transport and for many other purposes including, for example: ambient lighting in domestic and industrial buildings; advertising (as replacements for neon lights); and internal lighting in appliances such as refrigerators. In all such locations, a lighting device of the type shown in FIG. 6 offers the advantage that the light guide 1' can be easily installed in the support 20, with the correct orientation of the guide being ensured by its engagement with the support. FIG. 8, for example, shows such a lighting device 31 installed below the window in the door 32 of a car to illuminate the interior of the car and also to indicate to the occupants the location of items such as the door handle and window controls. In this case, the support 20 of the lighting device would first be secured in the desired position in the door by means, for example, of screws inserted through the apertures 25 in the base of the support 26, following which the light guide would simply be pushed into place in the support. A light source for illuminating the light guide 1' would be located at one end (or at each end) of the light guide, concealed within the door.

Figure 9:
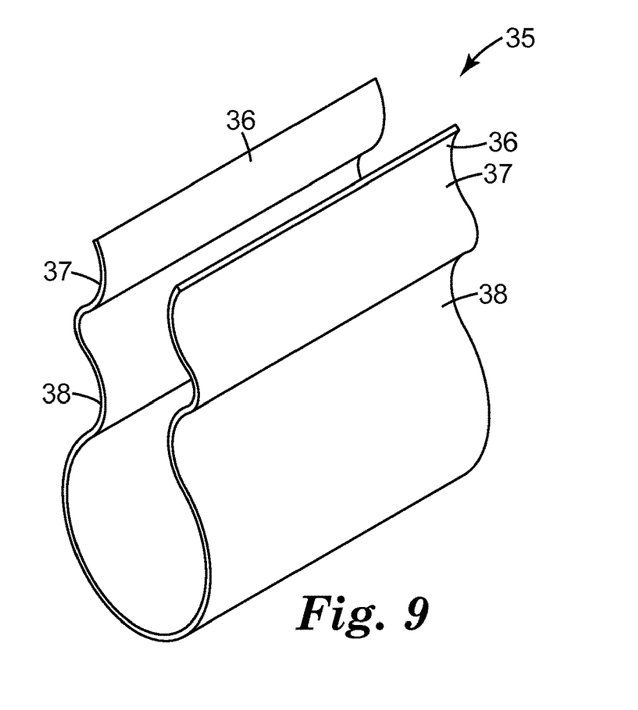
FIGS. 9 and 10 show perspective views of alterative supports suitable for use with the light guide of FIG. 2.
Figure 10:
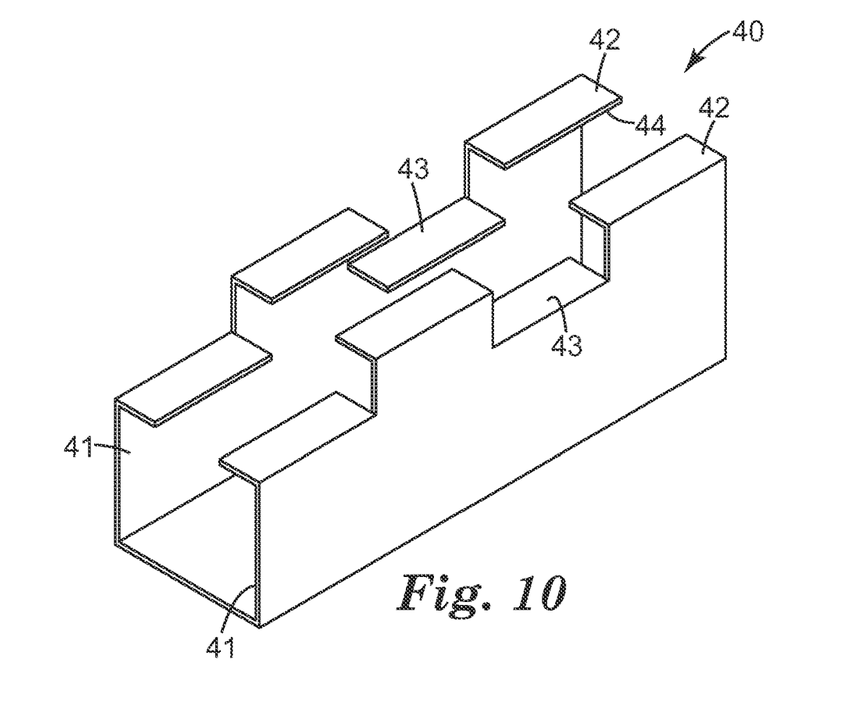

FIGS. 9 and 10 show alternative forms of support for the light guide 1' of FIG. 2, both of which are in the form of elongate channels of generally U-shaped cross-section but are more suited to manufacture from sheet metal.

The support 35 of FIG. 9 comprises curved, rather than angular, surfaces but is nevertheless able to make line contact with the light guide as described above for the support 20 of FIGS. 3 to 5. More particularly, each arm 36 of the support 35 comprises two inwardly-curved regions 37, 38 corresponding, respectively, to the outer and inner contact features 22, 23 of the support 20 of FIGS. 3 to 5. These inwardly-curved regions 37, 38 are able to make line contact with the light guide 1' when the latter is pushed into the support 35 and thus effectively provide contact edges comparable to the contact edges 24 of the support 20.

The support 40 of FIG. 10 also provides contact edges corresponding to the contact edges 24 of the support 20 of FIGS. 3 to 5 but, in this case, the edges are not continuous along the length of the support. More particularly, the upper edge of each arm 41 of the support 40 is crenellated and the upper edges of the crenellations are turned inwards thereby forming a series of intermittent outer contact features 42 (with respective contact edges 44) and a series of intermittent inner contact features 43 (with contact edges 45). The contact features 42, 43 function, respectively, in a similar manner to the outer and inner contact features 22, 23 of the support 20 of FIGS. 3 to 5.

Figure 11:
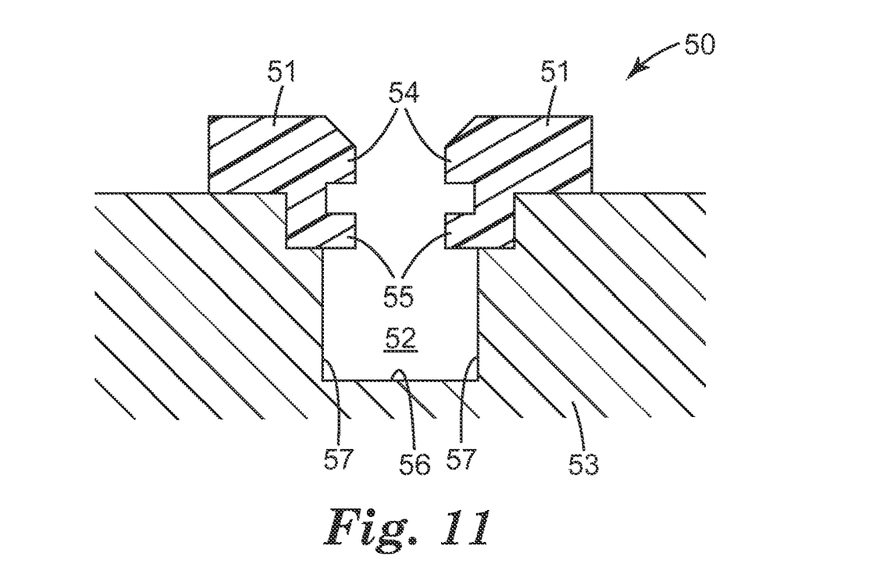
FIG. 11 is a transverse cross-section of yet another support suitable for use with the light guide of FIG. 2.

FIG. 11 shows yet another form of support for the light guide 1' of FIG. 2, in which part of the support is provided by the substrate on which the light guide is mounted.

The support 50 of FIG. 10 comprises two support members 51 secured in any suitable way along the top edges of a channel 52 in the substrate 53 on which the light guide 1' is to be mounted. The support members 51 are shaped on their inner surfaces to provide outer and inner contact features 54, 55 corresponding in shape and function to the outer and inner contact features 22, 23 of the support 20 of FIGS. 3 to 5. In this case, however, the remainder of the support (including, in particular, the base 56 that acts as a stop for the light guide) is provided by the channel 52 in the substrate 53, which should have similar dimensions, relative to the light guide 1' as the corresponding part of the support 20. In other words, the channel 52 should be shaped so that, when the light guide 1' is in position, the guiding surfaces 15 on the light guide are adjacent and parallel to the respective sides 57 of the channel and the notch containing surface 11 of the guide is adjacent, but spaced apart from, the base 56.

Figure 12:
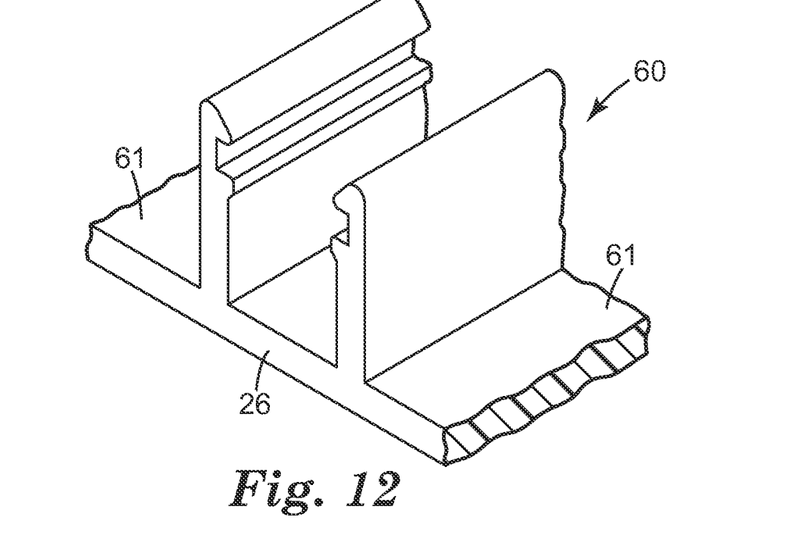
FIGS. 12 to 19 are perspective views of one end of alternative supports suitable for use with the light guide of FIG. 2.

FIG. 12 shows a support 60 similar to the support 20 shown in FIGS. 3 to 5, which is suitable for manufacture by injection moulding using the known technique of forced demoulding to remove the product from the injection mould. In this case, as an optional modification, the base 26 of the support is extended outwardly on each side of the support, as indicated at 61. The extensions 61 could be used to mount the support on a substrate. Alternatively, the support 60 could be integrated, through the extensions 61, into another moulded component (not shown): for example, in the case in which the support 60 is used for a lighting device in a car door as illustrated in FIG. 8, the support could be integrated, through the extensions 61, into the trim panel of the door.

Figure 13:
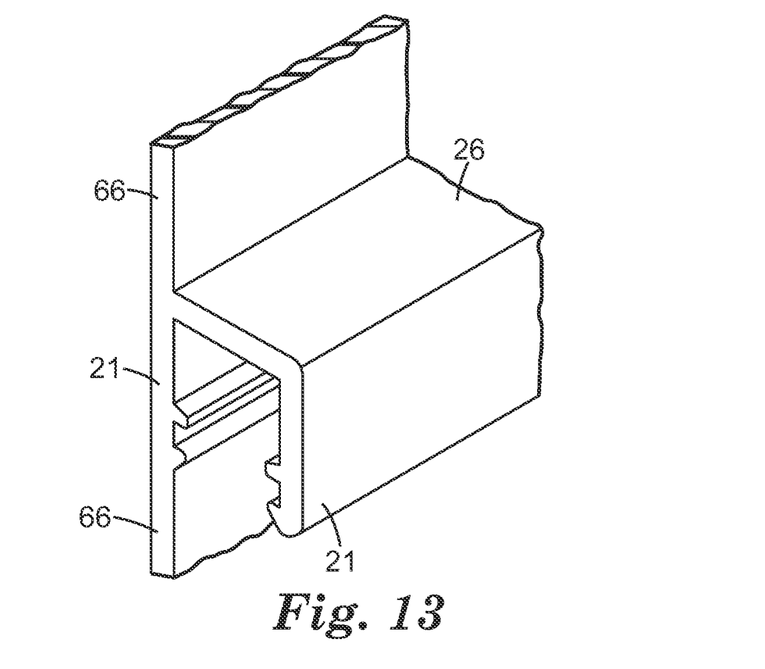

FIG. 13 shows a support 65 similar to the support 60 shown in FIG. 12 except that one arm 21 of the support (rather than the base 26) is extended, as indicated at 66. It will be appreciated that the other arm of the support could be extended instead, depending on the situation in which the support is to be installed and the required orientation of the support.

Figure 14:
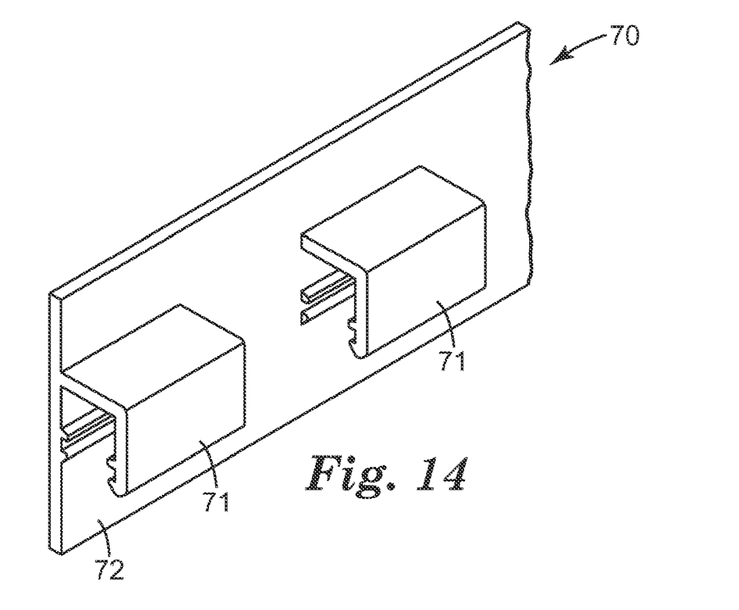

FIG. 14 shows a support 70 which is a modified version of the support 65 shown in FIG. 13. The support 70 differs in that the U-shaped channel is no longer continuous but in the form of spaced-apart sections 71 extending from a continuous planar section 72 formed by the extended arm 21, 66 of FIG. 13. The modification provides the support 70 with increased flexibility so that it can more easily be installed along a curved substrate.

Other modifications that can be made to the support 20 of FIGS. 3 to 5 to provide increased flexibility, as well as reducing the amount of material used in the support, are illustrated in FIGS. 15 to 18. Each of these modified supports comprises the same internal features as the support 20, in particular the inner and outer contact features 22, 23 providing respective contact edges 24, although those features are not always continuous along the length of the support. Nevertheless, the supports function in a similar manner to the support 20 of FIGS. 3 to 5.

Figure 15:
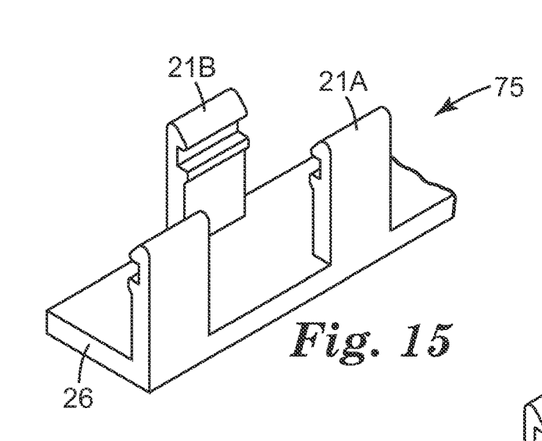

In the support 75 shown in FIG. 15, the base 26 of the support extends continuously along the length of the support but the arms comprise spaced-apart sections 21A on one side of the base and spaced-apart sections 21B on the other side of the base. In addition, the sections on one side of the base 26 are located opposite the spaces between sections on the other side of the base. The support 80 shown in FIG. 16 is similar except that the sections 21A on one side of the base are located opposite the sections 21B on the other side of the base 26.

Figure 16:
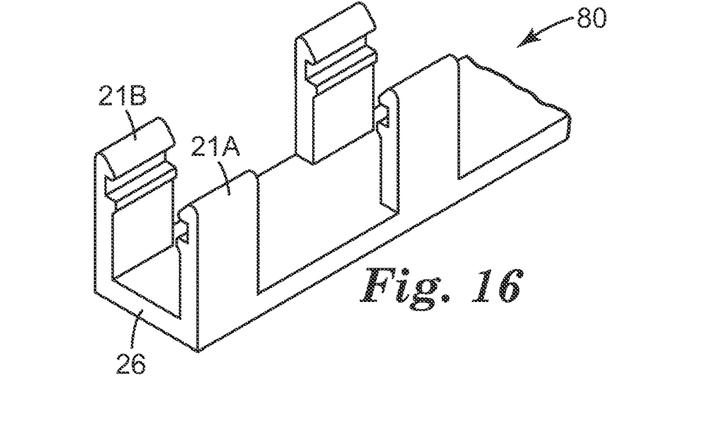
Figure 17:
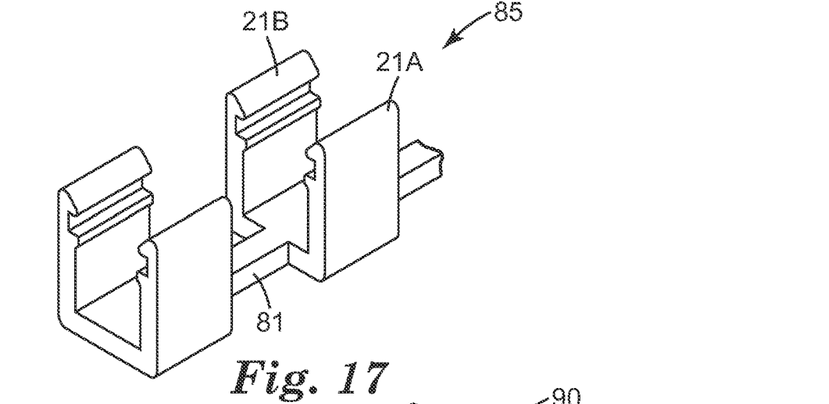

The support 85 shown in FIG. 17 is similar to the support 80 shown in FIG. 16 except that, in the regions between the opposed arm sections 21A, 21B, the width of the base 26 is decreased to form bridging sections 81. The decreased width has the effect of further increasing the flexibility of the support.

Figure 18:
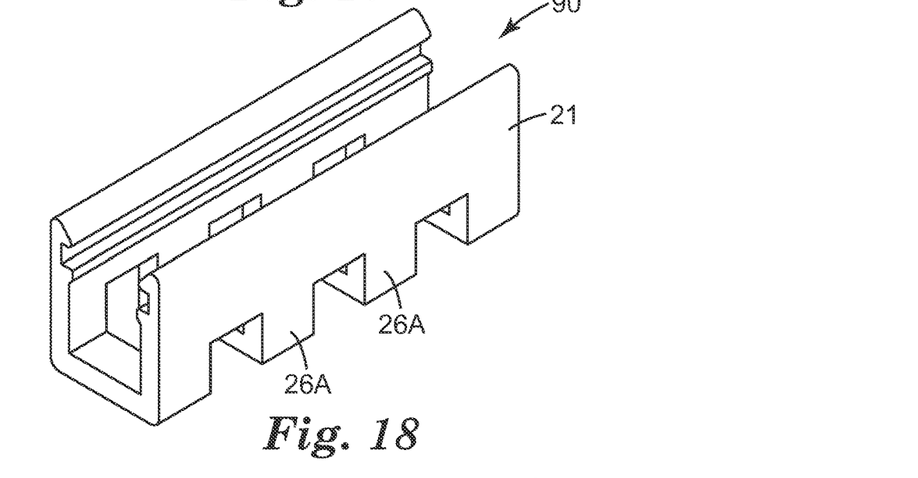
Figure 19:
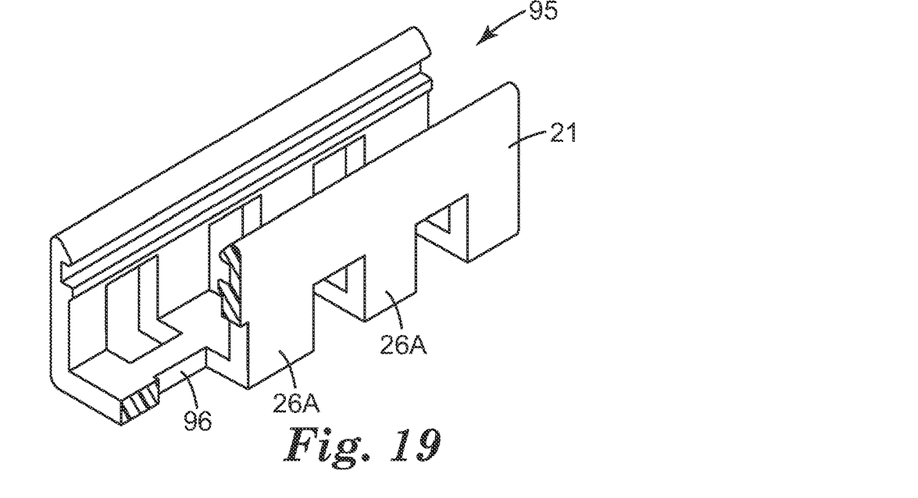

In the support 90 shown in FIG. 18, the upper part of the walls 21 of the support extend continuously along the length of the support but the base comprises spaced apart sections 26A. The support 95 shown in FIG. 19 is similar except that the spaced apart sections 26A of the base are connected by narrow bridging sections 96.

The supports described above with reference to FIGS. 3 to 5 and 9 to 19 can be provided in continuous lengths that are cut to the length required for a particular lighting device. Alternatively, they may be provided in pieces of a particular length (for example, 100 cm) that are placed end-to-end if a greater length is required. As a further alternative, the supports can be provided in comparatively short lengths and used only at intervals along the light guide. An arrangement of that type is shown in FIG. 20, in which a light guide 100 of the type described above with reference to FIG. 2 is located in spaced supports 101 which may have any of the forms described above with reference to FIGS. 3 to 5 and 9 to 19. Such an arrangement could be of particular use if the light guide 100 is required to follow a tightly-curving path.

The invention claimed is:

1. An elongate support for supporting and securing an elongate light guide, the support comprising:
    an elongate base; and
    opposing arms extending from the base and defining an elongate opening therebetween opposite the base, an upper edge of each arm being crenellated, wherein an upper edge of each crenellation is turned inwardly to form alternating higher and lower contact features.

2. The elongate support of claim 1, wherein when an elongate light guide is secured within the support, each contact feature makes a line contact with the elongate light guide.

3. The elongate support of claim 1, wherein when an elongate light guide is secured within the support, the only physical engagement between the support and the light guide is at the contact features.

* * * * *